United States Patent
Caldwell, Jr.

(10) Patent No.: US 6,929,770 B2
(45) Date of Patent: Aug. 16, 2005

(54) MANDREL-ASSISTED RESIN TRANSFER MOLDING PROCESS EMPLOYING RESIN OUTFLOW PERIMETER CHANNEL BETWEEN MALE AND FEMALE MOLD ELEMENTS

(75) Inventor: James D. Caldwell, Jr., Greenville, NC (US)

(73) Assignee: Caldwell Design and Fabrication, L.L.C., Greenville, NC (US)

( * ) Notice: Subject to any disclaimer, the term of this patent is extended or adjusted under 35 U.S.C. 154(b) by 0 days.

(21) Appl. No.: 10/655,903

(22) Filed: Sep. 5, 2003

(65) Prior Publication Data

US 2004/0047934 A1 Mar. 11, 2004

Related U.S. Application Data

(63) Continuation of application No. 09/828,293, filed on Apr. 6, 2001, now abandoned.

(51) Int. Cl.[7] ............................................... B29C 70/48
(52) U.S. Cl. ..................... 264/510; 264/102; 264/257; 264/554; 264/571; 425/112; 425/388; 425/405.1; 425/812

(58) Field of Search ................................ 264/554, 101, 264/102, 244, 510, 531, 538, 257, 258, 571; 425/112, 388, 389, 390, 405.1, 812

(56) References Cited

U.S. PATENT DOCUMENTS

| | | | |
|---|---|---|---|
| 4,759,893 A | 7/1988 | Krauter | 264/258 |
| 5,087,193 A | 2/1992 | Herbert, Jr. | 264/257 |
| 5,256,366 A | 10/1993 | Wejrock et al. | 264/101 |

*Primary Examiner*—Donald Heckenberg
(74) *Attorney, Agent, or Firm*—Allen, Dyer, Doppelt, Milbrath & Gilchrist, P.C.

(57) ABSTRACT

A mandrel-assisted resin transfer molding process and apparatus therefor provides a generally continuous, narrow annular channel between the perimeter of an inner male mold element and an outer female mold element. This channel allows air, heat and vapor to evenly escape and resin to outflow from the mold cavity everywhere around the edge of the part being molded. A very thin resin band forms in the channel is easily trimmed away, leaving the article completely finished on both sides and having a well defined edge that does not require shaping.

5 Claims, 4 Drawing Sheets

MANDREL-ASSISTED RESIN TRANSFER MOLDING PROCESS EMPLOYING RESIN OUTFLOW PERIMETER CHANNEL BETWEEN MALE AND FEMALE MOLD ELEMENTS

CROSS-REFERENCE TO RELATED APPLICATIONS

The present application is a continuation of U.S. patent application Ser. No. 09/828,293, filed Apr. 6, 2001, now abandoned, by J. Caldwell, Jr., entitled: "Mandrel-Assisted Resin Transfer Molding Process Employing Resin Outflow Perimeter Channel Between Male And Female Mold Elements", and is assigned to the assignee of the present application and the disclosure of which is incorporated herein.

FIELD OF THE INVENTION

The present invention relates in general to resin transfer molding (RTM) process and apparatus therefor, and is particularly directed to a new and improved RTM architecture that employs a generally continuous and relatively narrow, annular channel between the perimeter of an inner male mold element and an outer female mold element. This perimeter channel allows resin and air to readily escape everywhere around the edge of the part being molded, resulting in the molded part having a well defined edge of resin material, so as to not require further shaping after removal from the mold. The perimeter channel also allows the resin to expand evenly around the part, facilitating heat dissipation, extending the life of the mold, and providing higher part yield.

BACKGROUND OF THE INVENTION

Until recently, a variety of hardware manufacturing and assembly enterprises, such as the boat manufacturing industry, have made many of the parts employed in their products as partially finished components—those which are finished on only one side (the side visible to and engaged by the user). As market demands have now driven many of these companies to produce many, if not all, of their parts as completely finished components, these manufacturers have turned to the use of resin transfer molding (RTM) processes of the type which have been well established in the automotive and aircraft industry. However, because of the relatively low volume per part, these enterprises cannot afford the very substantial cost of very robust (typically steel) molds used in RTM processes employed in the automotive and aircraft industries. Instead, the RTM systems that have been used for low margin, limited part production, such as in the marine manufacturing industry, are typically made from less robust materials, such as epoxy resins, which suffer from poor part yield and are prone to frequent failures.

A standard RTM process typically places a fiber preform of the part to be molded within a mold cavity, whose geometric shape is defined by the volumetric spacing between an outer, female mold half, and an inner male mold half. The two mold halves or elements are joined together and effectively sealed at their circumferential edges, capturing a perimeter portion of a structural (fiber) preform therebetween. Non-limiting examples of fibers used in fiber preforms include fiberglass, graphite, carbon and Kevlar, and the fibers are often braided or woven into a sheet form.

In order to mold a part, it is customary practice to inject a liquid resin (such as an epoxy resin, polyester resin, and the like) into the mold cavity, typically by a negative pressure created by means of a vacuum pump. The liquid resin is usually heated to mold temperature, i.e., catalyzed, in a heated pressure tank and pressure-injected through a resin flow line coupled to the mold cavity. The mold cavity has one or more bleed vents that are ported to a collection reservoir to which the vacuum pump is coupled. Transfer/injection of the liquid resin into the mold cavity may be facilitated by introducing pressurized gas into the pressure tank, which in turn causes the pressurized resin to flow into the mold cavity. As the pressurized, heated resin is introduced into the mold cavity, it thoroughly wicks or is absorbed by the fiber preform.

At various times after pressure-injecting the heated resin into the mold cavity, the mold operator will open the line coupled between the collection reservoir and the mold cavity, in order to bleed resin from the mold cavity and into the collection reservoir. The collection reservoir may include a sight glass to enable the operator to view released resin, and determine, based upon on his experience and skill, whether it contains air bubbles. If air bubbles are visible, indicating that the cavity has not been completely filled with resin, the operator closes the line to the collection reservoir, and continues to introduce additional pressurized resin into the mold cavity. This resin bleeding and inspection process is repeated, as necessary, until the operator is satisfied that the mold cavity has been completely purged of air, and filled with resin (which has saturated the fiber preform).

Each repetition of the resin bleeding and inspection step is time consuming, primarily due to the fact that, after the operator bleeds resin into the collection reservoir, the pressure tank must be pressurized again. Typically, this bleeding and inspection step is repeated at least three or four times for each molded article, making the resin transfer molding process a relatively lengthy and expensive task. Resin is also wasted each time the operator is required to bleed the resin into the collection reservoir to inspect it for air bubbles. Because this occurs several times during the molding of each article, the volume of wasted resin and associated cost can be substantial.

Another drawback of such a conventional molding process is the fact that it relies upon operator judgment to hopefully correctly determine (based upon what the operator perceives is a lack of air bubbles in the resin bled into the collection reservoir) if and when the mold cavity and fiber preform have been completely filled with resin. Even if the operator accurately observes no air bubbles in resin that has been bled into the collection reservoir, this is no assurance that the mold cavity is free of voids. The operator can only rely on what the bleed port or ports reveal; he has no picture of the entirety of the mold. This inability of the operator to ensure that the mold is void-free results in poor repeatability, and lower overall quality and yield of the articles being produced. It also increases glass print transfer into the finished surface of the part.

In addition, irrespective of the skill and experience of the operator, the architecture and manner of assembly of the two mold halve themselves can result in a less than satisfactory product. The circumferential edge regions at which the male and female mold halves are joined together customarily capture a perimeter portion of a fiber preform placed between the two mold halves. As this can cause bunching together or even pulling of the fibers of the preform, it leads to inconsistencies in the thickness and density of the preform material at the joined mold edges and also within the mold cavity. This not only causes variations in the dimensions of the molded article, but can create variations in the flow of resin through the mold cavity, leading to air pockets, that are not discovered until the part has been cured and removed from the mold.

SUMMARY OF THE INVENTION

Pursuant to the invention, the above-discussed problems of conventional RTM schemes are effectively obviated by a new and improved mandrel-assisted RTM system which, rather than forming a seal between its two mold halves, is configured as an unsealed architecture, having a predesigned narrow, generally continuous channel between the interior perimeter of the outer female mold element and the exterior perimeter of the inner male mold element. This annular channel not only facilitates the venting of air everywhere around the edge of the part being molded, but allows for expansion of the resin evenly around the part as it flows out into the channel. This results in the part having a well defined edge that does not require shaping after removal from the mold, and serves to allow heat, air and vapor to escape. Heat dissipation reduces glass print in finish, extending the life of the mold, and providing higher part yield. The escape of vapor prevents softening of the gel coat and mitigates against glass print and distortion. Allowing air to escape prevents trapped bubbles from expanding during exotherm and shrinking during cool down, that may otherwise cause distortion of the part.

In accordance with a non-limiting but preferred embodiment, the architecture of the improved molding apparatus of the present invention, the channel results from spacing the vertical sidewall of lip portion of the inner male mold element that terminates the mold cavity a prescribed distance from a mutually facing portion of the interior sidewall of the outer female mold element. In order to accurately dimensionally locate the male mold element within the interior volume of the female mold element, indexing elements may be affixed a spaced apart locations around the top surface of the lip portion of the male mold element and configured to engage the top edge surface of the female mold element.

These indexing elements vertically locate the male mold element relative to the top surface of the female mold element, placing the male mold element into the female mold element at a depth that precisely defines the geometry parameters of the mold cavity. Once inserted, the male mold element may be retained in its intended mold cavity-forming position by means of clamps and the like at the various indexing elements. As an auxiliary measure, the upper portion of the mold assembly may be engaged by a mandrel coupled to a vacuum. The vacuum closure augments the outflow of resin and removal of air pockets from the mold cavity through the annular channel, as the male mold element is compressed against the resin-impregnated preform.

As resin is drawn out from the mold cavity, it enters the channel, forming a thin band of resin that is contiguous with the resin in the mold cavity. This thin band creates resin weight around the edge of the mold to assist in forcing air out of the mold cavity and increasing part density. Once the resin has cured, and the mold halves removed, the thin resin band is readily excised from the part, leaving the article completely finished on both sides, as desired.

DETAILED DESCRIPTION

Figure 1:
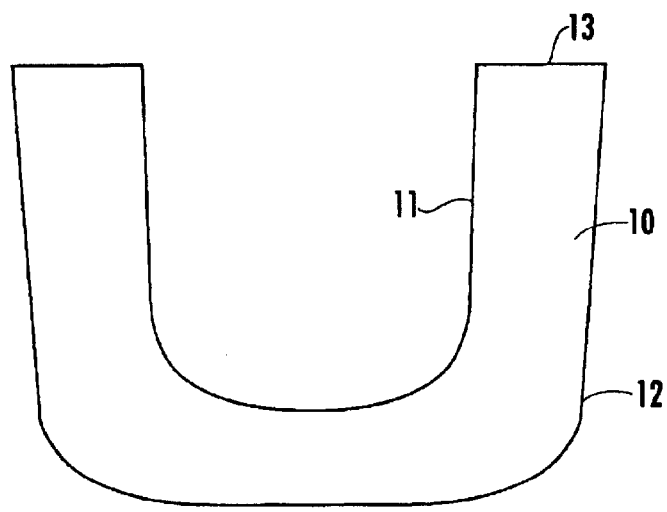
FIGS. 1–8 diagrammatically illustrate respective steps of the mandrel-assisted RTM process embodying the present invention.

Before describing in detail the new and improved mandrel-assisted resin transfer molding method and apparatus therefor in accordance with the present invention, it should be observed that the invention resides primarily in a prescribed geometric relationship between mutually adjacent sidewall surfaces of each of the interior male mold element and the outer female mold element. As a consequence, the configurations of the components of the mandrel-assisted resin transfer molding architecture of the invention and the manner in which they are positioned relative to one another have, for the most part, been illustrated in the drawings in a readily understandable diagrammatic pictorial format, which shows only those specific details that are pertinent to the present invention, so as not to obscure the disclosure with details which will be readily apparent to those skilled in the art having the benefit of the description herein.

Figure 7:
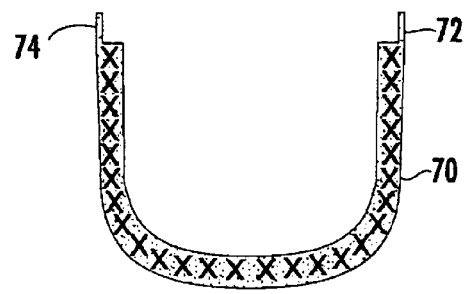
Figure 8:
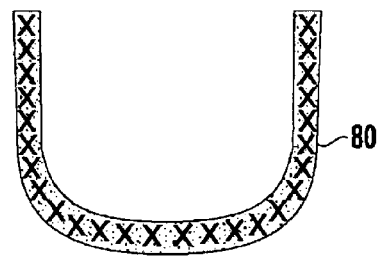
Figure 9:
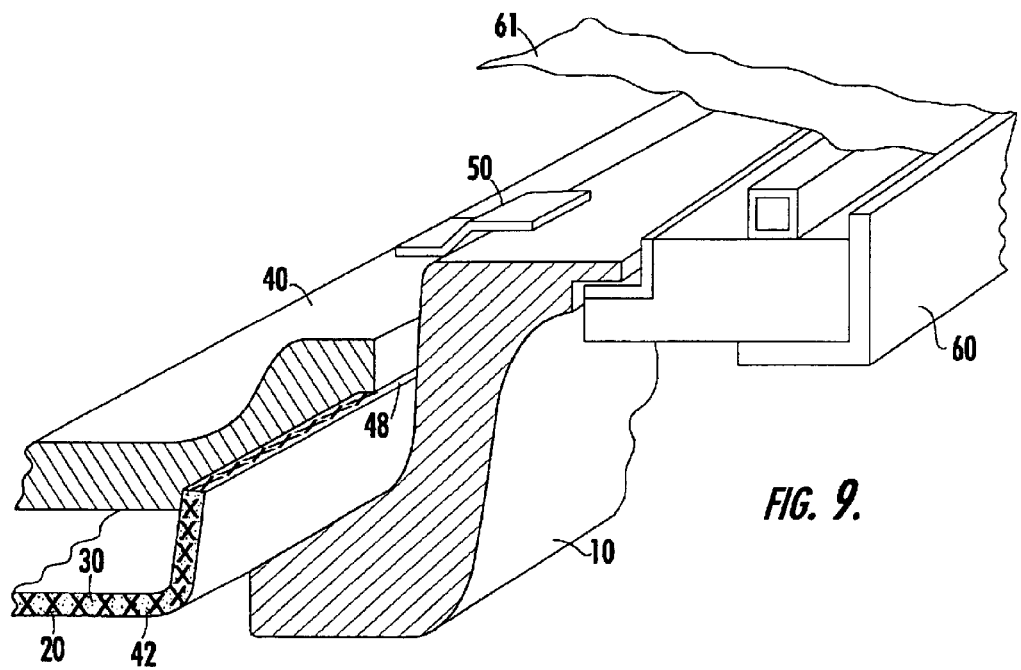
FIGS. 9 and 10 are respective partial perspective and side views of an RTM architecture associated with the process depicted in FIGS. 1–8.

Attention is now directed to FIGS. 1–8, which are diagrammatic illustrations of the molding of an article in accordance with successive steps of the RTM process embodying the present invention while FIG. 9 is a diagrammatic partial perspective view of an RTM architecture associated with the process depicted in FIGS. 1–8.

As illustrated in FIG. 1, the process employs an outer female mold element 10, shown as having a generally U-shaped cross-section for purposes of providing a reduced complexity exemplary embodiment. As a non-limiting example, each of the male and female mold elements may be made of a hard and rigid synthetic material, such as polyester resin, and the like. This greatly reduces the cost of the mold and is in sharp contrast to conventional RTM processes of the type used in the aircraft and automotive industries, in which the mold cavity is subjected to relatively high resin-injection pressures. In the present invention, such pressures are not encountered as the annular channel around the mold cavity provides for air, heat and resin outflow pressure relief.

The female mold element 10 has an interior sidewall surface 11 associated with a first surface of the article to be molded, an outer surface 12, and a top edge surface 13. As pointed out briefly above, and as will become apparent from the description to follow, the outer female mold element 10 is sized such that the interior sidewall surface 11 is sufficiently deep to accommodate a prescribed 'vertical indexing' of the position of a male mold element that is placed within the female mold element to form a mold cavity therebetween.

Figure 2:
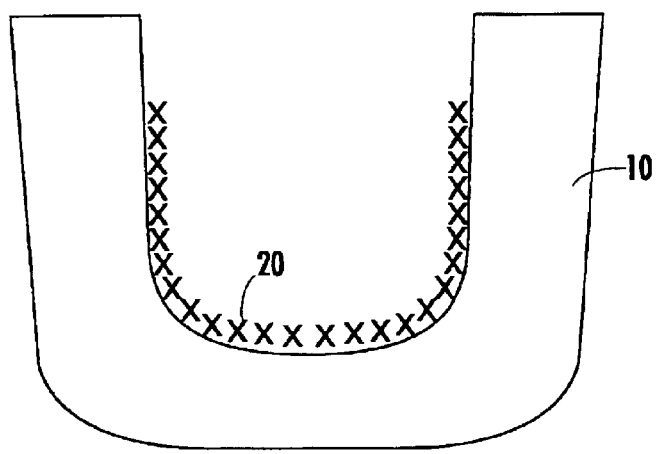

FIG. 2 shows the insertion of a structural preform 20 adjacent to and generally conforming with that portion of the interior surface 11 of the female mold element that is to define the mold cavity in association with an inserted male mold element. As described above, the structural preform may comprise any of a variety of fibers used in conventional preforms, including, but not limited to fiberglass, graphite, carbon and Kevlar, and the fibers may be braided or woven into a sheet form.

Figure 3:
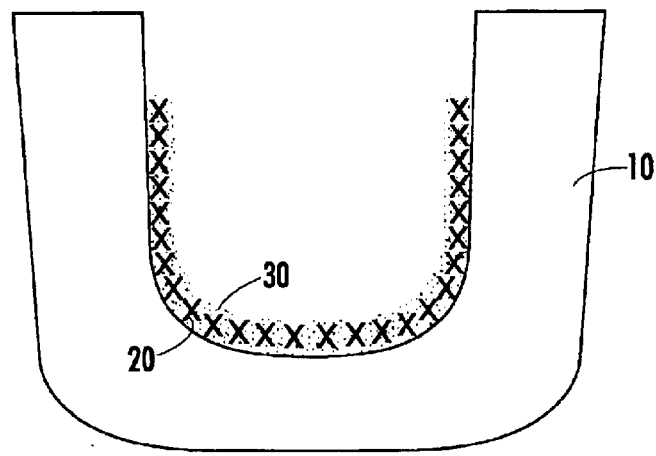

Next, as shown in FIG. 3, a conventional liquid resin material 30 is introduced (for example by pouring or spraying) into the interior of the female mold element 10, and begins wicking the fibers of the inserted preform 20. The volume of liquid resin introduced into the female mold element 10 should be at least equal and preferably larger than the volume of the mold cavity. With the presence of the structural preform 20, this will ensure that the resin will completely saturate the fibers of the structural preform in the course of insertion and compression of the male mold element, and expand outwardly therefrom into the channel between the mold elements.

Figure 4:
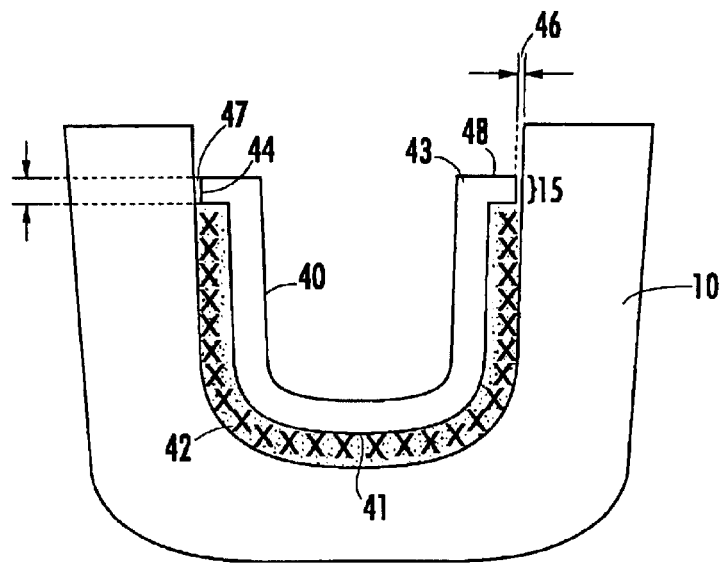

FIG. 4 shows the insertion of an inner male mold element 40 into the interior space of the female mold element 10 containing the structural preform 20 and the liquid resin 30. The inner male mold element 40 has an exterior surface 41 associated with a second finished surface of the article to be molded, and is shaped and sized to form a mold cavity 42 between its exterior surface 41 and the interior surface 11 of the outer female mold element 10. In addition, a lip portion 43 of the inner male mold element 40 that terminates the mold cavity 42 has a perimeter sidewall 44 that extends a prescribed vertical distance alongside, but is spaced apart by a prescribed gap or separation 46 from, a mutually facing portion 15 of the interior sidewall 11 of the outer female mold element 10.

As a non-limiting example, the perimeter sidewall 44 of the lip portion 43 of the inner male mold 40 may have a vertical height or thickness on the order of one-half inch, while the gap 46 may be on the order of one-sixteenth of an inch. This separation between the two mold halves creates a generally continuous annular channel 47 therebetween. While it is preferred that the channel extend continuously around or cover one hundred percent of the perimeter of the mold cavity, the invention may be accomplished with a less than one-hundred percent continuous channel (namely, have a generally continuous coverage, e.g., on the order of fifty-one hundred percent). The generally continuous annular channel serves to vent air, and allows outward exothermic expansion of the resin 30 that has been poured into the structural preform 20, in the course of impingement of the male mold element upon the resin and the compression of the male mold element toward the female mold element to define the geometry of the mold cavity.

Figure 5:
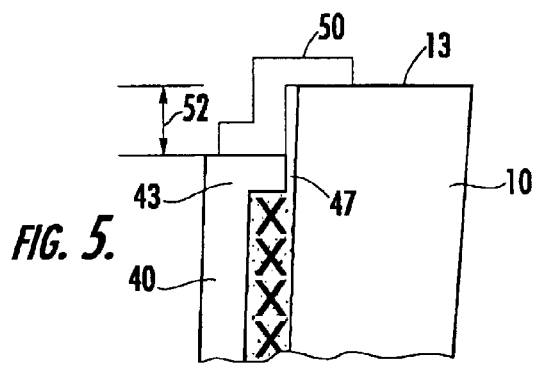

In order to accurately dimensionally locate the male mold element 40 within the interior volume of the female mold element 10, a set of indexing elements or tabs, one of which is shown at 50 in FIG. 5, may be affixed a spaced apart locations around the top surface 48 of the lip portion 43 of the male mold element 40, and are shaped so as to engage the top edge surface 13 of the female mold element 10. A respective indexing element 50 is sized so as to locate the top surface 48 of the lip portion 43 of the male mold element 40 a prescribed vertical offset 53 from the top surface 13 of the female mold element. This prescribed vertical offset is preestablished to place the male mold element 40 into the female mold element 10 at the requisite depth that precisely defines the geometry parameters of the mold cavity 42. Once inserted, the male mold element 40 may be retained in its intended mold cavity-forming position by means of clamps and the like at the various indexing elements 50.

Figure 6:
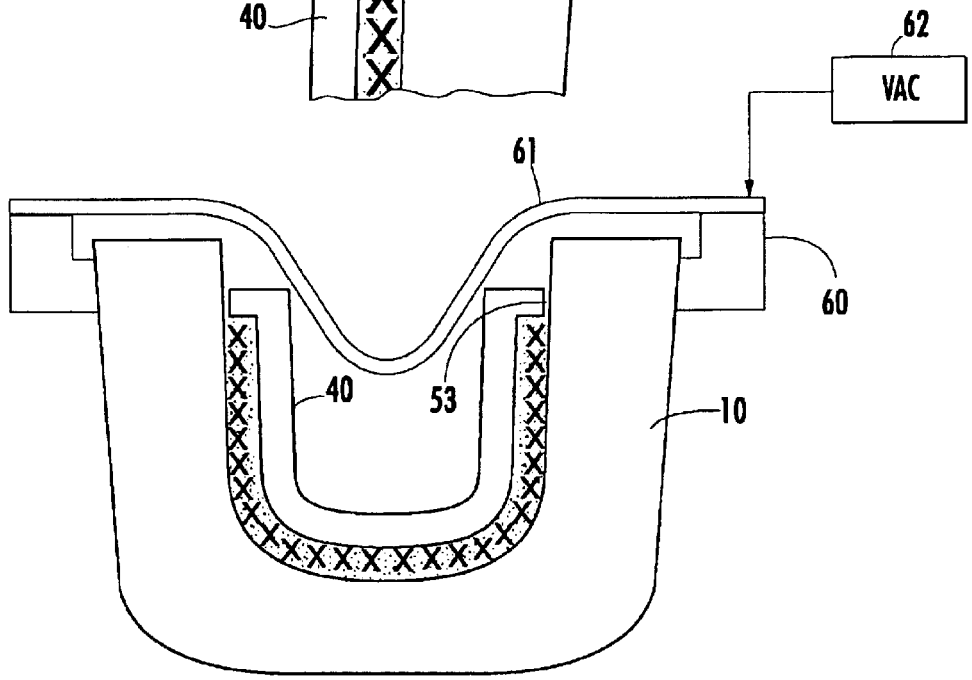

As an auxiliary measure, shown in FIG. 6, the upper portion of the mold assembly of FIG. 5 may be engaged by a closure mandrel or frame 60, having a flexible cover 61 (such as a silicon/neoprene cover, as a non-limiting example), and coupled to a source of vacuum 62. This vacuum closure augments the outflow of resin and removal of air pockets from the mold cavity 42 through the annular channel 47, as the male mold element 40 is compressed against the resin impregnated preform 20. As resin is drawn out from the mold cavity, it enters the annular channel 47, resulting in the formation of a thin band or ring of resin 53 that is contiguous with the resin filled mold cavity 42. This thin resin band 53 creates resin weight around the edge of the mold cavity 42, which assists in forcing air out and increasing part density. It also allows air to wick from inside the mold cavity 42 and escape around the edge into the annular channel 47.

Figure 10:
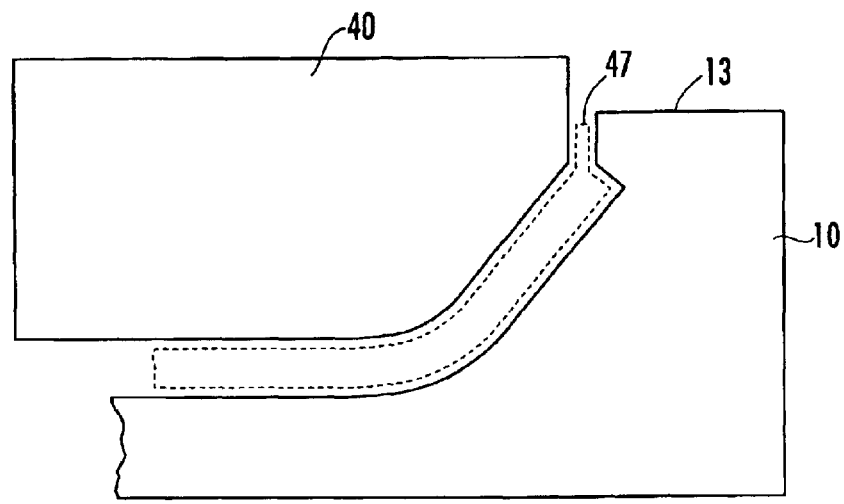

As shown in the partial side view of FIG. 10, the generally continuous annular channel 47, described above, prevents excess flange material of the molded part from forming along the top edge surface 13 of the female mold element 10. This allows the molded part to be readily extracted from the inner mold 10, when an attempt is made to remove (rotate) the inner male mold element 40 from the molded part and out of the female mold element.

Figure 11:
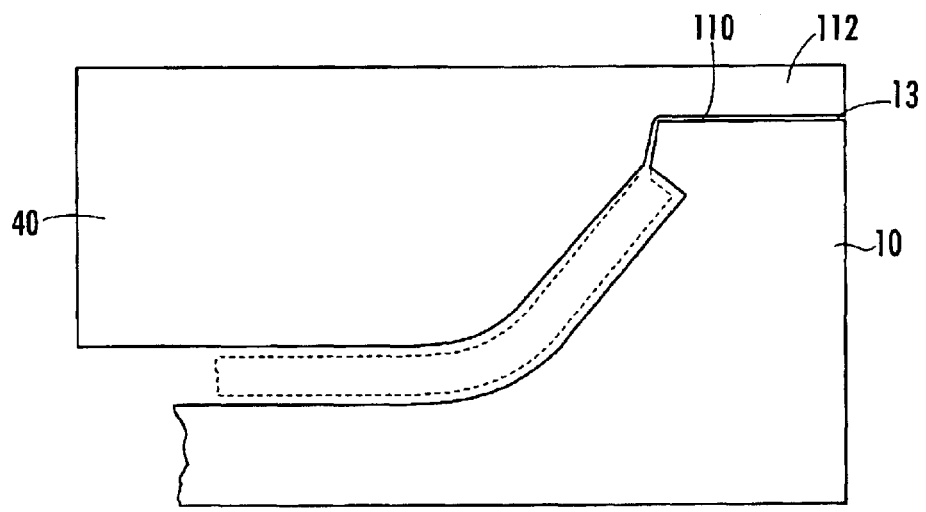
FIG. 11 is a partial side view of a conventional RTM architecture.

In constrast thereto, in a conventional mold, shown in the partial side view of FIG. 11, it is not uncommon for fibers of the structural preform 20 to extend onto the top edge surface 13 of the female mold element 10. When the inner male mold 45 is clamped down onto the female mold 10, these fibers become compressed or squeezed into a tightly bunched matting 110 between a lip 112 of the inner male mold 40 and the top edge surface 13 of the female mold element 10. As a consequence, the molded part can have excess flange material 110 extending between the lip 112 of the inner male mold 40 and the top edge surface 13 of the female mold element 10, causing the molded part to become effectively 'locked' to the outer, female mold 10. This impairs removal of the molded part, when the inner male mold element 40 is removed.

FIG. 7 shows the molded article, after the resin has cured, and the mold halves have been removed. In addition to precisely conforming with the configuration of the mold cavity, the molded article 70 has a very narrow (e.g., 62.5 mils wide) annular or circumferential resin band 72 that has formed along its peripheral edge 74, as a result of resin being drawn out from the mold cavity 42 and entering the narrow channel 47 contiguous therewith, as described previously. Using a simple knife cut, this cured resin band is readily excised from the part, as shown in FIG. 8, leaving the article 80 completely finished on both sides.

As will be appreciated from the foregoing description, the unsealed mold architecture of the mandrel-assisted RTM system of the present invention effectively obviates the above-discussed problems of conventional RTM schemes by its use of a narrow channel between the interior perimeter of the outer female mold element and the exterior perimeter of the inner male mold element. This annular channel facilitates venting air around the edge of the part being molded, dissipates heat to reduce glass print, and allows for expansion of the resin evenly around the part as it flows out into the channel.

This results in the part having a well defined edge that does not require shaping after removal from the mold, and serves to allow heat, air and vapor to escape. The dissipation of heat reduces glass print in finish, extends the life of the mold, and provides higher part yield. The escape of vapor prevents softening of the gel coat and mitigates against glass print and distortion. Allowing air to escape prevents trapped bubbles from expanding during exotherm and shrinking during cool down, that may otherwise cause distortion of the part. Because the resin band that forms in the channel is very thin it is readily trimmed away using a simple knife cut, leaving the article completely finished on both sides and having a well defined edge that does not require shaping.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. A method Of manufacturing an article comprising the steps of:
   (a) providing a rigid outer female mold element having an interior surface associated with a first surface of said article;
   (b) providing a rigid inner male mold element having an exterior surface associated with a second surface of said article, and being sized to be placed within an interior region of said outer female mold element, so as to define a mold assembly-forming and unsealed annular mold cavity between said interior surface of said outer female mold element and said exterior surface of said inner male mold element, said inner male mold element having a perimeter sidewall that is adapted to extend a vertical distance alongside, but spaced apart from, a mutually facing interior sidewall of said outer female mold element when said inner male mold is inserted into said outer female mold, such that said inner mold element is not sealed against said outer female mold element;
   (c) placing a structural preform within said interior region of said outer female mold element;
   (d) introducing a volume of liquid resin into said interior region of said female mold element, thereby wicking fibers of said structural preform and producing a resin-impregnated preform, said volume of liquid resin being larger that the volume of said annular mold cavity defined between said outer female mold element and said inner mold element when inserted into said outer female mold element;
   (e) inserting said inner male mold element within said interior region of said outer female mold element, and performing only mandrel-based compression of said inner male mold element against said resin-impregnated preform produced at said interior region of said female mold element in step (d), while spacing said inner male mold element apart from said outer female mold element by a prescribed spatial offset that forms geometry parameters of said unsealed annular mold cavity, as well as a generally continuous narrow annular channel that is contiguous with said unsealed mold cavity, and through which air is vented and into which resin introduced in step (d) is allowed to expand from said annular mold cavity, as said inner male mold element is compressed against said liquid resin; and
   (f) after curing of said resin, removing said mold assembly to produce a resin transfer molded article.

2. The method according to claim 1, wherein step (e) comprises spacing said inner male mold element apart from said outer female mold element by means of a plurality of indexing elements, which engage said inner male mold element and said outer female mold element, and provide said prescribed spatial offset that forms geometry parameters of said unsealed mold cavity between said inner male mold element and said outer female mold element.

3. The method according to claim 2, wherein step (e) comprises clamping said inner male mold element into a fined position within said interior region of said outer female mold element, so as to retain said inner male mold element in a mold cavity-forming position.

4. The method according to claim 1, further including the step of:
   (g) removing a band of cured resin formed along an edge of said resin transfer molded article provided in step (a) as a result of resin outflow from said mold cavity into said channel.

5. A method of manufacturing a resin transfer molded article comprising the steps of:
   (a) providing a rigid outer female mold element having an interior surface associated with a first surface of said article;
   (b) providing a rigid inner male mold element having an exterior surface associated with a second surface of said article, and being sized to be placed within an interior region of said outer female mold element, so as to define a mold assembly forming an unsealed mold cavity between said interior surface of said outer female mold element and said exterior surface of said inner male mold element, said inner male mold element having a perimeter sidewall, that is adapted to extend a vertical distance alongside, but spaced apart from, a mutually facing interior sidewall of said outer female mold element when said inner male mold is inserted into said outer female mold, such that said inner mold element is not sealed against said outer female mold element;
   (c) placing a structural preform within said interior region of said outer female mold element;
   (d) introducing a volume of liquid resin into said interior region of said female mold element, thereby wicking fibers of said structural preform and producing a resin-impregnated preform, said volume of liquid resin being larger that the volume of said unsealed mold cavity defined between said outer female mold element and said inner mold element when inserted into said outer female mold element;
   (e) providing a plurality of indexing elements, which engage said inner male mold element and said outer female mold element, and provide a prescribed spatial offset that forms geometry parameters of an unsealed mold cavity between said inner male mold element and said outer female mold element;
   (f) inserting said inner male mold element within said interior region of said outer female mold element, arid performing only mandrel-based compression of said inner male mold element against said resin-impregnated preform produced at said interior region of said female mold element in step (d), while said indexing elements cause said inner male mold element to be spaced apart from said outer female mold element by said prescribed spatial offset that forms geometry parameters of said unsealed mold cavity, as well as a generally continuous narrow annular channel that is contiguous with said unsealed mold cavity, and through which air is vented and into which resin introduced in step (d) is allowed to expand from said mold cavity as a result of mandrel-compression of said inner male mole element against said resin-impregnated preform at said interior region of said female mold element;
   (g) clamping said inner male mold element into a fixed position within said interior region of said outer female mold element, so as to retain said inner male mold element in a mold cavity-forming position, and allowing said resin to cure; and
   (h) after curing said resin, removing said mold assembly and removing a band of cured resin formed along an edge of said resin transfer molded article as a result of resin outflow from said mold cavity into said channel to thereby form said resin transfer molded article.

* * * * *